United States Patent
Sakakibara

(10) Patent No.: US 7,675,658 B2
(45) Date of Patent: Mar. 9, 2010

(54) METHOD AND APPARATUS FOR FORMING IMAGE

(75) Inventor: Jun Sakakibara, Tokyo (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 166 days.

(21) Appl. No.: 12/041,227

(22) Filed: Mar. 3, 2008

(65) Prior Publication Data

US 2008/0158625 A1 Jul. 3, 2008

Related U.S. Application Data

(63) Continuation of application No. 10/378,066, filed on Mar. 4, 2003, now Pat. No. 7,339,709.

(51) Int. Cl.
H04N 1/46 (2006.01)
H04N 1/40 (2006.01)
H04N 1/04 (2006.01)

(52) U.S. Cl. ............ 358/514; 358/512; 358/471; 358/483

(58) Field of Classification Search .......... 358/514, 358/512, 471, 483, 513
See application file for complete search history.

(56) References Cited

U.S. PATENT DOCUMENTS

| | | | | |
|---|---|---|---|---|
| 5,946,427 A | * | 8/1999 | Kanemitsu | 382/312 |
| 6,822,680 B1 | * | 11/2004 | Kanda | 348/273 |
| 7,027,193 B2 | * | 4/2006 | Spears et al. | 358/471 |
| 2003/0053157 A1 | | 3/2003 | Sakakibara et al. | |

FOREIGN PATENT DOCUMENTS

| | | |
|---|---|---|
| JP | 2-170694 A | 7/1990 |
| JP | 2000-324345 A | 11/2000 |
| JP | 2001-238053 A | 8/2001 |

OTHER PUBLICATIONS

U.S. Appl. No. 10/391,623, filed Mar. 20, 2003, Sakakibara et al.

* cited by examiner

*Primary Examiner*—Houshang Safaipour
(74) *Attorney, Agent, or Firm*—Foley & Lardner LLP

(57) ABSTRACT

When a monochromatic original is read, a control is effected to transfer a charge accumulated in a monochromatic photodiode array to a rear stage, and not to accumulate charges in respective color photodiode arrays. When a color original is read, a control is effected to transfer charges accumulated in the respective photodiode arrays and not to accumulate a charge in the monochromatic photodiode array.

1 Claim, 7 Drawing Sheets

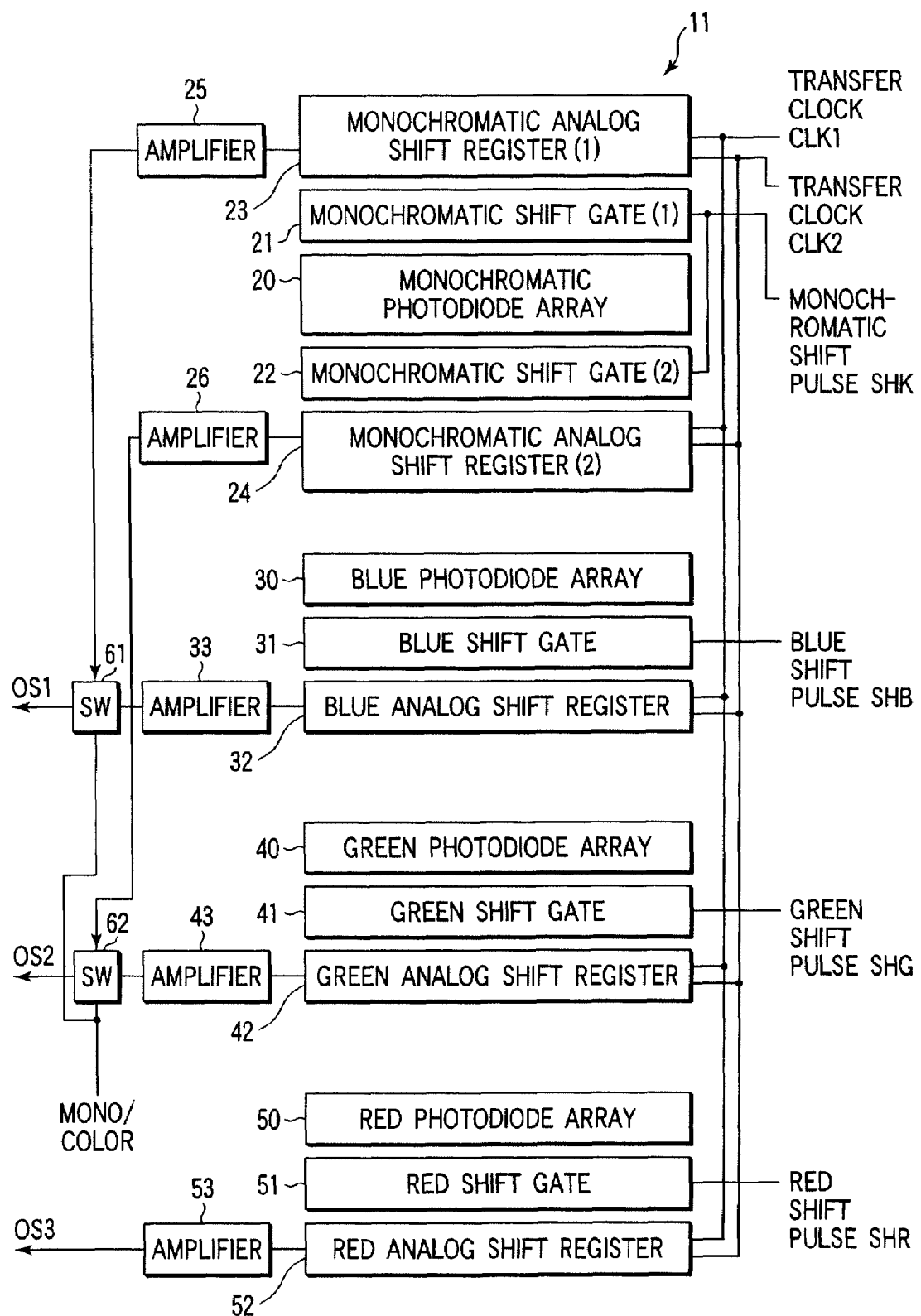
F I G. 3

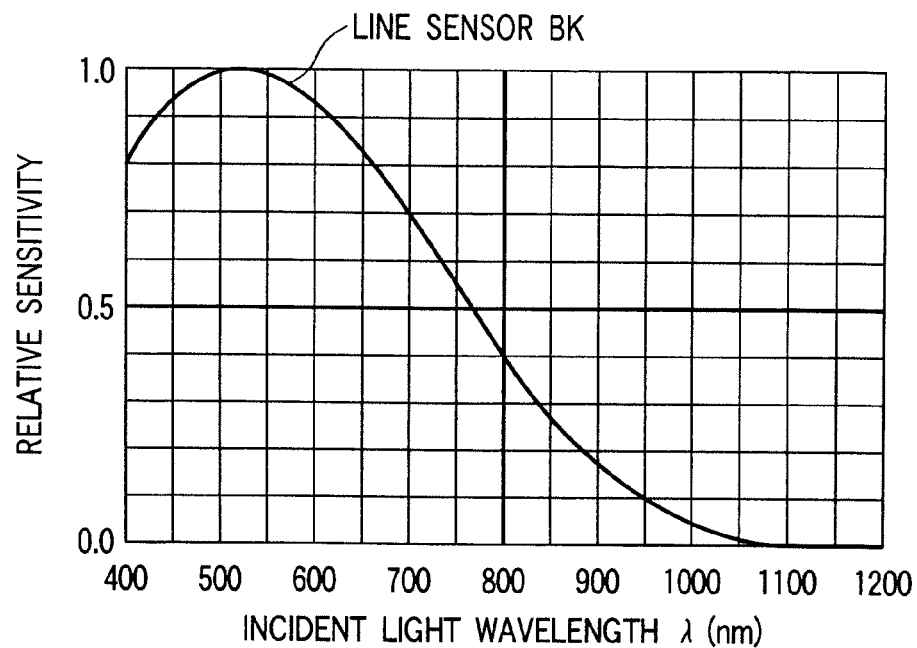
F I G. 4
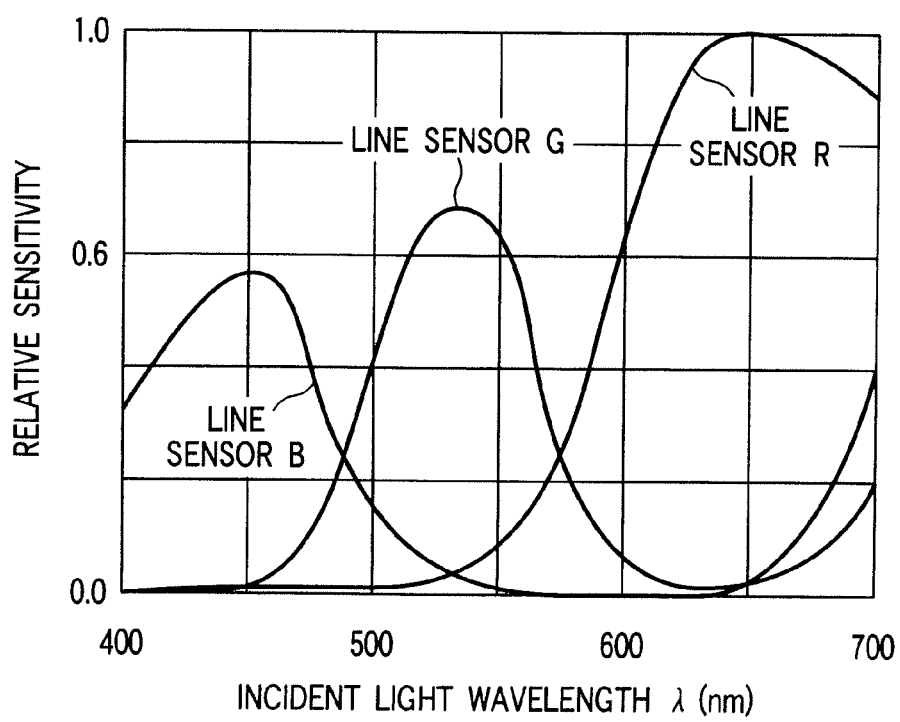
F I G. 5

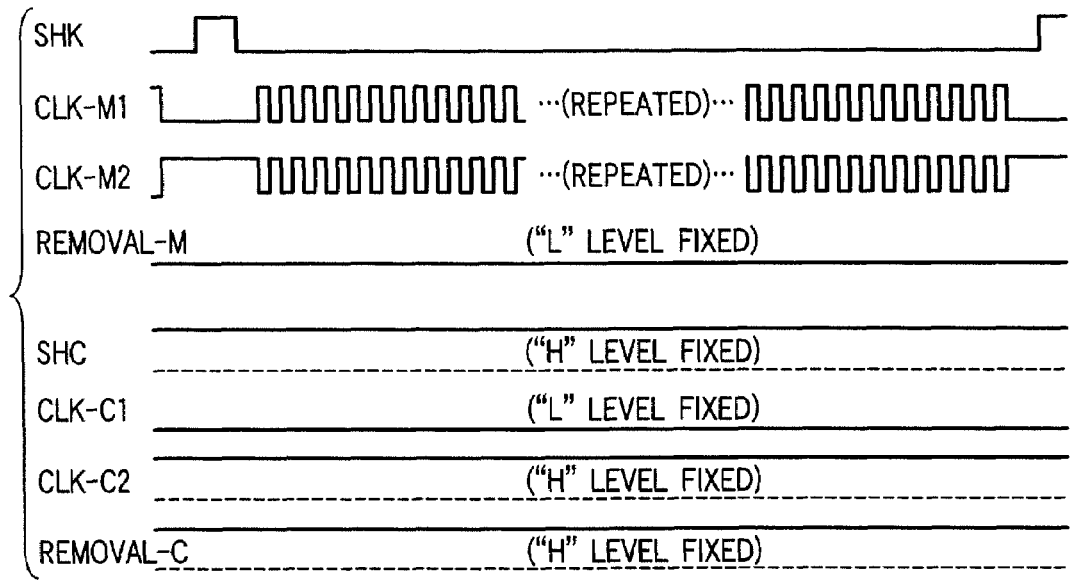
F I G. 10
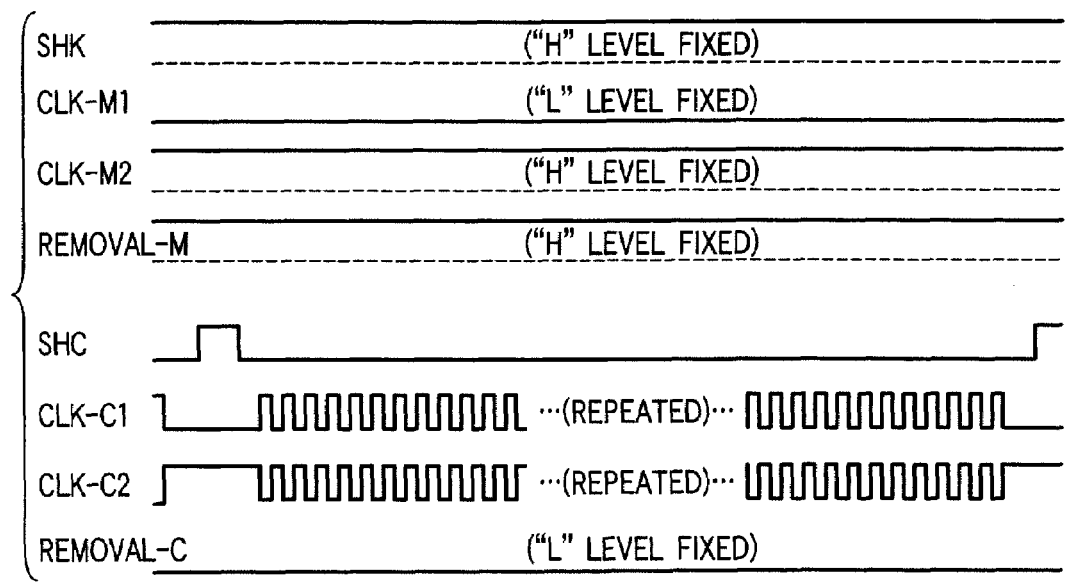
F I G. 11

METHOD AND APPARATUS FOR FORMING IMAGE

CROSS-REFERENCE TO RELATED APPLICATIONS

The present application is continuation of U.S. application Ser. No. 10/378,066, filed Mar. 4, 2003, the entire contents of which are incorporated herein by reference.

BACKGROUND OF THE INVENTION

The present invention relates to an image input apparatus and an output control method, for example, in a color scanner or a color digital copying machine, which reads image information by scanning an original using a color CCD line sensor.

A 4-line CCD sensor has conventionally been marketed as a CCD line sensor used in a reduction optical system. The 4-line CCD sensor includes a sensor section wherein color filters are not arranged on a light-receiving surface of a photodiode array, and a 3-line CCD sensor wherein color filters having characteristics of the optical three primary colors of RED, GREEN and BLUE.

In order to reduce a unit device price of a CCD sensor and to compose an optical system using inexpensive parts, there is a tendency that the pixel size of the CCD sensor is reduced and the chip length is increased.

Specifically, there is a tendency that the pixel pitch (inter-pixel distance) is reduced from several-ten μm to 7.0 μm, and further to 4.7 μm.

In terms of operation speed, a higher speed is required by the system side using a CCD line sensor.

A CCD line sensor is a device for converting received optical energy to electrical energy (specifically, voltage). If the pixel pitch decreases, the angular aperture, which is a light-receiving area, decreases. As a result, an output amplitude decreases.

To solve this problem, there is a means for increasing an incident light amount. However, the amount of light of a generally used white xenon lamp is limited. It is known that if the amount of light is increased, the life decreases.

Another means for increasing the amplitude of an output signal is a method wherein the amplification factor of an output amplifier provided at the final stage of the CCD line sensor is increased. According to this method, even if the amount of charge converted by the photodiode array is small, the charge can be electrically amplified and a desired output signal amplitude can be obtained. Therefore, at present, there are many cases where the amplification factor of the amplifier at the output stage is set at a high value, and the sensor having a high sensitivity as a selling point is marketed.

Based on the above background, CCD line sensors, which meet requirements of the market, that is, a high integration density with a single package containing a plurality of photodiode arrays, a small size with a narrow pixel pitch, a high sensitivity with an increased internal amplification factor and a high operation speed, have recently been put on the market.

However, owing to the high integration density and small size, the inter-wire distance in the CCD line sensor decreases, and it becomes difficult to keep an area for a guard-ring pattern, etc. for preventing mixing of radiant noise. Furthermore, since high-speed driving is required, a large current is needed for internal control signals.

Although driving with a large current is required, protection against internal radiant noise is not provided. Thus, noise is possibly superimposed on internal wiring.

Besides, since the internal amplification factor is increased for the high sensitivity, slight induced noise may greatly be amplified at the final stage and output. In fact, there is a CCD line sensor wherein induced noise is superimposed on an output signal and an output waveform is disturbed.

As has been described above, a 3-line CCD sensor or a 4-line CCD sensor comprising a plurality of photodiode arrays has such advantages that the high-speed operation is performed and the output signal amplitude is easily attained. On the other hand, it has such a disadvantage that noise of a drive signal tends to be superimposed on an output signal waveform. If such noise is superimposed, good image information cannot be obtained.

BRIEF SUMMARY OF THE INVENTION

The object of the present invention is to provide an image input apparatus and an output control method capable of obtaining good image information by preventing noise of a drive signal from being superimposed on an output signal waveform.

In order to achieve the object, the present invention may provide an image input apparatus having a light source that illuminates an original, a first photodiode array that reads reflective light from a monochromatic original illuminated by the light source, and second, third and fourth photodiode arrays that read reflective light from a color original illuminated by the light source, comprising: a first control section that effects, when the monochromatic original is read, a control to output a charge photoelectrically converted and accumulated by the first photodiode array and a control not to accumulate charges photo-electrically converted by the second, third and fourth photodiode arrays; and a second control section that effects, when the color original is read, a control to output charges photoelectrically converted and accumulated by the second, third and fourth photodiode arrays and a control not to accumulate a charge photoelectrically converted by the first photodiode array.

The invention may also provide an output control method for controlling output of charges which are photoelectrically converted by a first photodiode array that reads reflective light from a monochromatic original illuminated by a light source, and by second, third and fourth photodiode arrays that read reflective light from a color original illuminated by the light source, comprising: effecting, when the monochromatic original is read, a control to output a charge photoelectrically converted and accumulated by the first photodiode array and a control not to accumulate charges photoelectrically converted by the second, third and fourth photodiode arrays; and effecting, when the color original is read, a control to output charges photoelectrically converted and accumulated by the second, third and fourth photodiode arrays and a control not to accumulate a charge photoelectrically converted by the first photodiode array.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 3 is a block diagram schematically showing the structure of a CCD board having a 4-line CCD sensor;

FIG. 4 shows an example of spectral sensitivity characteristics of a monochromatic photodiode array;

FIG. 5 shows an example of spectral sensitivity characteristics of respective color photodiode arrays;

FIG. 10 is a view for explaining a drive timing at the time of monochromatic reading;

FIG. 11 is a view for explaining a drive timing at the time of color reading;

DETAILED DESCRIPTION OF THE INVENTION

Embodiments of the present invention will now be described with reference to the accompanying drawings.

Figure 1:
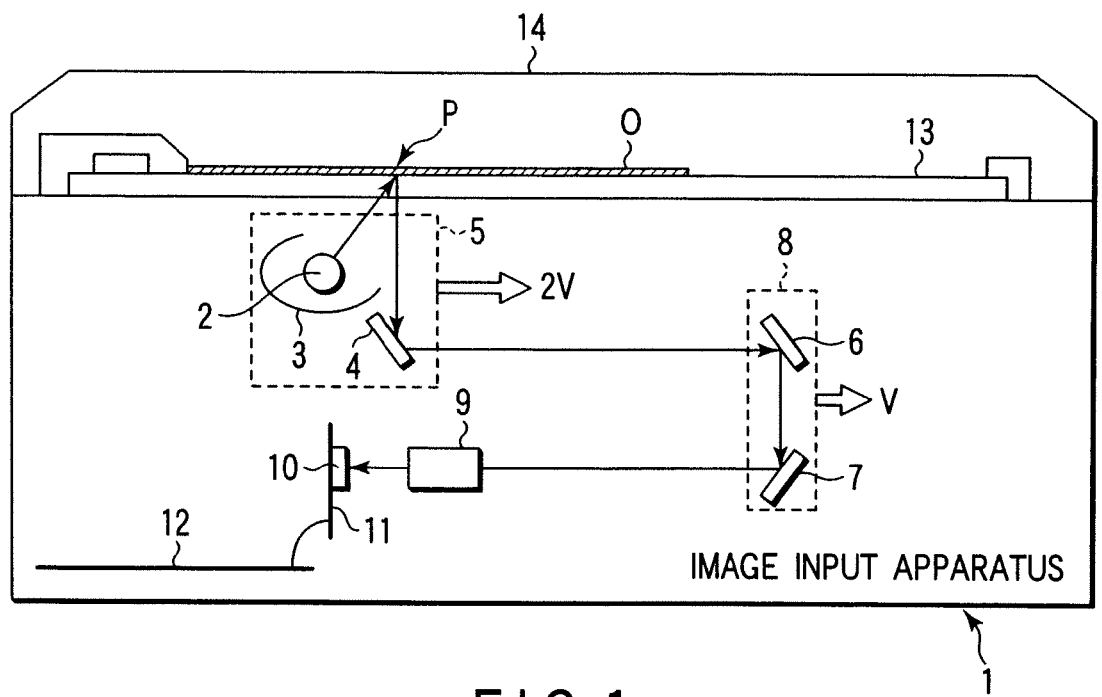
FIG. 1 is a cross-sectional view of an image input apparatus using a 4-line CCD sensor according to the present invention.

FIG. 1 shows an image input apparatus 1 using a 4-line CCD sensor according to the present invention. The image input apparatus 1 is an apparatus for reading image information on an original in units of a line corresponding to a resolution.

The image input apparatus 1 comprises a first carriage 5 including a light source 2, a reflector 3 for adjusting a luminous intensity distribution of the light source 2, and a first mirror 4; a second carriage 8 including a second mirror 6 and a third mirror 7; a converging lens 9; a 4-line CCD sensor 10; a CCD board 11 on which the 4-line CCD sensor 10 and sensor drive circuits (not shown) are mounted; and a CCD control board 12 having a control circuit for controlling the 4-line CCD sensor 10 and an image processing circuit for processing output signals from the 4-line CCD sensor 10.

The operation of the image input apparatus 1 is described.

When an original O is placed on an original glass 13, the original O is held by an original cover 14 in close contact with the original glass 13. Then, the light source 2, such as a fluorescent lamp, a xenon lamp or a halogen lamp, is turned on, and light is radiated on the original O through the original glass 13. Reflective light from a read position P on the original O passes through the original glass 13 and is reflected by the first mirror 4, second mirror 6 and third mirror 7. The reflected light is focused on a light receiving surface of the 4-line CCD sensor 10 via the converging lens 9.

The reflective light from the original O, which is focused on the light receiving surface of the 4-line CCD sensor 10, is converted from optical energy to an electric signal by the 4-line CCD sensor 10. The electric signal is subjected to various processes in the image processing circuit on the CCD control board 12, which is provided at the rear stage.

The first carriage 5 and second carriage 8 are moved at speeds 2V and V in the direction of the arrow (in the right direction in FIG. 1), respectively. Thereby, the read position P on the original O is shifted. In this case, the optical path length from the read position P to the 4-line CCD sensor 10 is kept constant.

Figure 2:
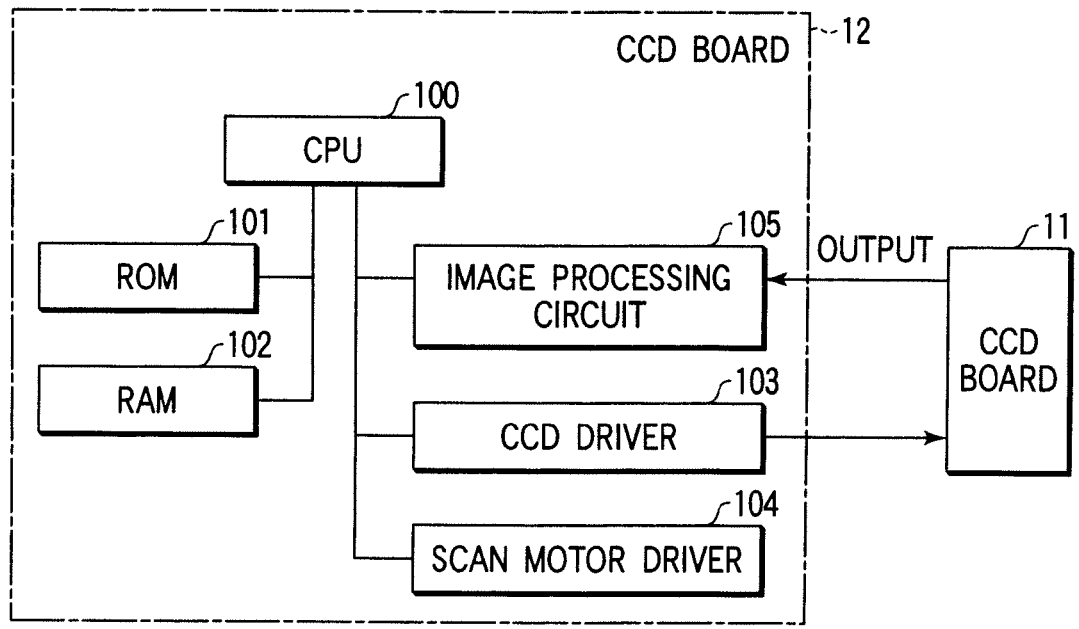
FIG. 2 schematically shows the structure of a CCD control board.

FIG. 2 schematically shows the structure of the CCD control board 12. The following components are mounted on the CCD control board 12: a CPU 100 that controls the entirety of the apparatus; a ROM 101 that stores control programs, etc.; a data storage RAM 102; a CCD driver 103 that is connected to the CCD board 11 and drives the 4-line CCD sensor 10; a scan motor driver 104 that controls the rotation of a scan motor (not shown) for moving the first carriage 8, etc.; and an image processing circuit 105 that processes output signals from the 4-line CCD sensor 10.

FIG. 3 schematically shows the structure of the CCD board 11 having the 4-line CCD sensor 10. The 4-line CCD sensor 10 comprises a monochromatic photodiode array 20 where color filters are not arranged on a light receiving surface of the line sensor, as mentioned above, a BLUE photodiode array 30 where a BLUE color filter is arranged, a GREEN photodiode array 40 where a GREEN color filter is arranged, and a RED photodiode array 50 where a RED color filter is arranged.

FIG. 4 shows an example of spectral sensitivity characteristics (line sensor BK) of the monochromatic photodiode array 20.

FIG. 5 shows examples of spectral sensitivity characteristics (line sensor B) of the BLUE photodiode array 30, spectral sensitivity characteristics (line sensor G) of the GREEN photodiode array 40, and spectral sensitivity characteristics (line sensor R) of the RED photodiode array 50.

As is shown in FIGS. 4 and 5, when light is uniformly radiated from the light source 2, each of the line sensor R, line sensor G and line sensor B has a sensitivity only to a specific range of wavelengths, while the line sensor BK has a sensitivity to a wide range of wavelengths between a region less than 400 nm and a region over 1000 nm. Thus, the amplitude of the analog signal from the line sensor BK is greater than that of the analog signal from each of the line sensors R, G and B.

Charges that are photoelectrically converted and accumulated by the monochromatic photodiode array 20 are transferred to a monochromatic analog shift register 23 and a monochromatic analog shift register 24 via a monochromatic shift gate 21 and a monochromatic shift gate 22, respectively.

The monochromatic shift gate 21 is associated with charge transfer of odd-number pixels, and the monochromatic shift gate 22 is associated with charge transfer of even-number pixels. The monochromatic shift gate 21 and the monochromatic shift gate 22 are controlled by a monochromatic shift pulse SHK.

The charges transferred to the monochromatic analog shift register 23 and monochromatic analog shift register 24 are successively shifted to the output direction by a transfer clock CLK1 and a transfer clock CLK2. The charge in the monochromatic analog shift register 23 is converted to a voltage signal and amplified by an amplifier 25. The amplified signal is delivered to a switch circuit (SW) 61. Similarly, the charge in the monochromatic analog shift register 24 is converted to a voltage signal and amplified by an amplifier 26. The amplified signal is delivered to a switch circuit (SW) 62.

A charge that is photoelectrically converted and accumulated by the BLUE photodiode array 30 is transferred to a BLUE analog shift register 32 via a BLUE shift gate 31. The BLUE shift gate 31 is controlled by a BLUE shift pulse SHB.

The charge transferred to the BLUE analog shift register 32 is successively shifted to the output direction by the transfer clock CLK1 and transfer clock CLK2. The charge in the BLUE analog shift register 32 is converted to a voltage signal and amplified by an amplifier 33. The amplified signal is delivered to the switch circuit (SW) 61.

A charge that is photoelectrically converted and accumulated by the GREEN photodiode array 40 is transferred to a GREEN analog shift register 42 via a GREEN shift gate 41. The GREEN shift gate 41 is controlled by a GREEN shift pulse SHG.

The charge transferred to the GREEN analog shift register 42 is successively shifted to the output direction by the transfer clock CLK1 and transfer clock CLK2. The charge in the GREEN analog shift register 42 is converted to a voltage signal and amplified by an amplifier 43. The amplified signal is delivered to the switch circuit (SW) 62.

A charge that is photoelectrically converted and accumulated by the RED photodiode array 50 is transferred to a RED analog shift register 52 via a RED shift gate 51. The RED shift gate 51 is controlled by a RED shift pulse SHR.

The charge transferred to the RED analog shift register 52 is successively shifted to the output direction by the transfer clock CLK1 and transfer clock CLK2. The charge in the RED analog shift register 52 is converted to a voltage signal and amplified by an amplifier 53. The amplified signal is output as an output signal OS3.

The switch circuits 61 and 62 are switched between a monochromatic image input mode and a color image input mode by a switch signal (MONO/COLOR) supplied from the CPU 100.

In FIG. 3, when the switch signal MONO/COLOR is "L", monochromatic image reading is effected. Monochromatic signals output from the amplifiers 25 and 26 are rendered effective and are output to the outside as output signals OS1 and OS2. On the other hand, when the switch signal MONO/COLOR is "H", color image reading is effected. A BLUE signal from the amplifier 33 and a GREEN signal from the amplifier 43 are rendered effective and are output to the outside as output signals OS1 and OS2.

In this manner, even when the monochromatic image reading is effected, the internal circuits for a color image (BLUE, GREEN, RED) operate. In addition, even when the color image reading is effected, the internal circuit for a monochromatic image operates.

Consequently, at the time of monochromatic image reading, the monochromatic signal is affected by the induction due to the adjacent BLUE output signal and the drive signal such as the transfer clock. In addition, at the time of color image signal, the color signal is affected by the induction due to the adjacent monochromatic output signal and the drive signal such as the transfer clock.

The present invention aims at reducing the effect of the aforementioned induction noise.

In the above-described structure, the drive timing on the CCD board 11 having the 4-line CCD sensor 10 shown in FIG. 3 will now be described with reference to FIGS. 6, 7 and 8. The drive timing is controlled by the CPU 100 on the CCD control board 12 that is the control section.

Figure 6:
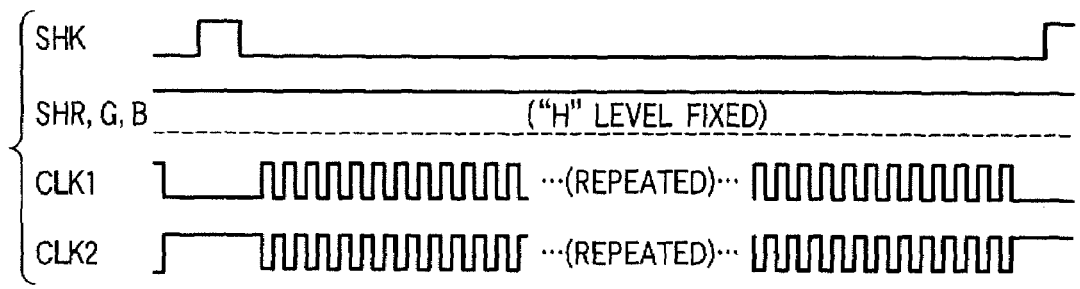
FIG. 6 is a view for explaining a drive timing at the time of monochromatic reading.

FIG. 6 shows the drive timing at the time of monochromatic reading. The charge photoelectrically converted and accumulated by the monochromatic photodiode array 20 is transferred to the monochromatic analog shift register 23 and monochromatic analog shift register 24 via the monochromatic shift gate 21 and monochromatic shift gate 22 by the application of the monochromatic shift pulse SHK. The charge photo-electrically converted and accumulated by the monochromatic photodiode array 20 corresponds to the reflective light from the original O.

At this time, the reflective light from the original O is also photoelectrically converted by the BLUE photodiode array 30, GREEN photodiode array 40 and RED photodiode array 50. However, since the BLUE shift pulse SHB, GREEN shift pulse SHG and RED shift pulse SHR are fixed at "H" level, no charge is accumulated in the photodiode arrays 30, 40 and 50. In other words, the charges photoelectrically converted by the photodiode arrays 30, 40 and 50 flow directly to the BLUE analog shift register 32, GREEN analog shift register 42 and RED analog shift register 52.

With the above control, at the time of monochromatic reading, image data output from the monochromatic analog shift register 23 and monochromatic analog shift register 24 becomes effective signals. On the other hand, the signals output from the BLUE analog shift register 32, GREEN analog shift register 42 and RED analog shift register 52 are the results of gradual accumulation of charges photoelectrically converted by the photodiode arrays (30, 40, 50) and are not in phase with the afore-mentioned monochromatic image data.

Thus, at the time of monochromatic reading in the embodiment, even if the monochromatic output signals are affected by induction due to the BLUE, GREEN and RED output signals, the BLUE, GREEN and RED output signals are low-frequency signals gradually accumulated, as mentioned above, and do not greatly affect the image quality.

Figure 7:
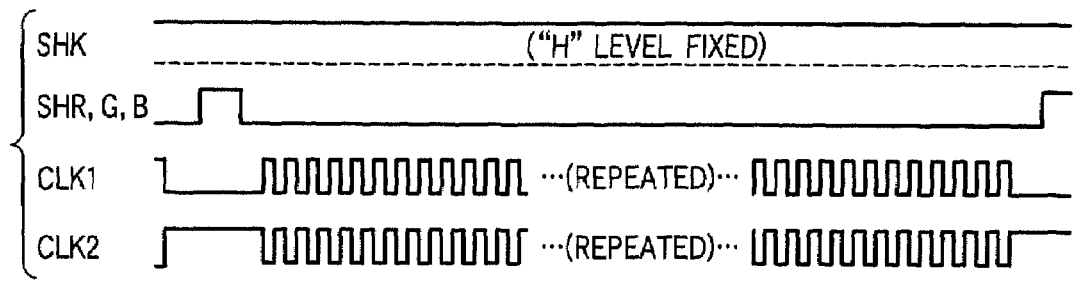
FIG. 7 is a view for explaining a drive timing at the time of color reading.

FIG. 7 shows the drive timing at the time of color reading. The charge photoelectrically converted and accumulated by the BLUE photodiode array 30 is transferred to the BLUE analog shift register 32 via the BLUE shift gate 31 by the application of the BLUE shift pulse SHB.

The charge photoelectrically converted and accumulated by the GREEN photodiode array 40 is transferred to the GREEN analog shift register 42 via the GREEN shift gate 41 by the application of the GREEN shift pulse SHG.

The charge photoelectrically converted and accumulated by the RED photodiode array 50 is transferred to the RED analog shift register 52 via the RED shift gate 51 by the application of the RED shift pulse SHR.

At this time, the reflective light from the original O is also photoelectrically converted by the monochromatic photodiode array 20. However, since the monochromatic shift pulse SHK is fixed at "H" level, no charge is accumulated in the monochromatic photodiode array 20. In other words, the charges photo-electrically converted by the monochromatic photodiode array 20 flow directly to the monochromatic analog shift registers 23 and 24.

With the above control, at the time of color reading, image data output from the BLUE analog shift register 32 and GREEN analog shift register 42 becomes effective signals. On the other hand, the signals output from the monochromatic analog shift registers 23 and 24 are the results of gradual accumulation of charges photoelectrically converted by the monochromatic photodiode array 20 and are not in phase with the aforementioned color image data.

Thus, at the time of color reading in the embodiment, even if the BLUE, GREEN and RED output signals are affected by induction due to the monochromatic output signals, the monochromatic output signals are low-frequency signals gradually accumulated, as mentioned above, and do not greatly affect the image quality.

Figure 8:
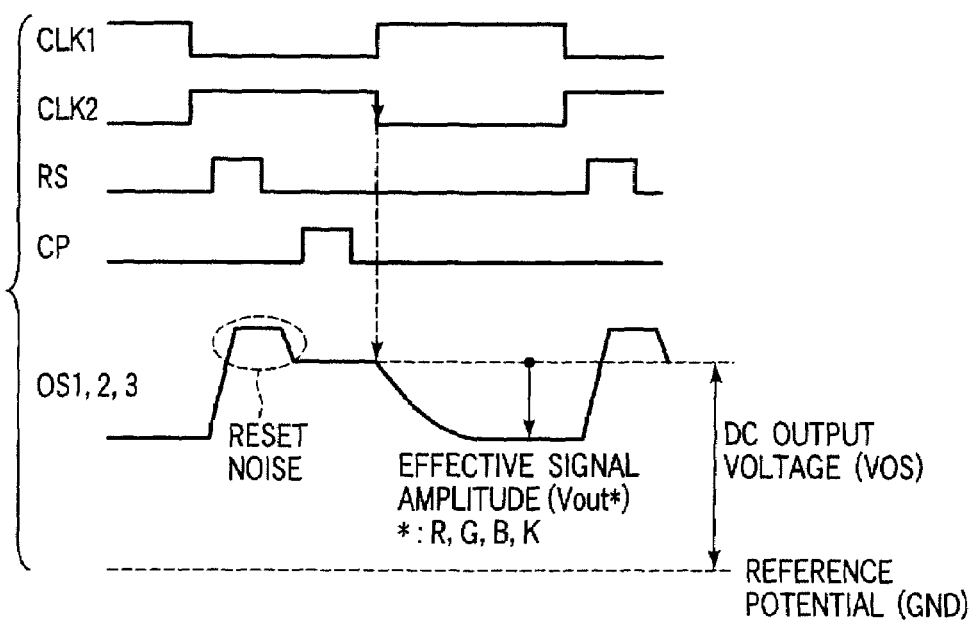
FIG. 8 is a view for explaining a drive timing of each signal.

FIG. 8 illustrates the timing of transfer clocks CLK1 and CLK2, a reset pulse RS, a clamp pulse CP and output signals OS1, OS2 and OS3.

The transfer clocks CLK1 and CLK2 are signals having phases which are different from each other by 180°. As shown in FIG. 8, the transfer clock CLK1 is an inverted signal of the transfer clock CLK2.

At the falling edge of the transfer clock CLK2, a voltage proportional to the reflective light from the original O appears downward, as shown in FIG. 8, from a level of a DC offset component included in the output signal (OS1, OS2, OS3) which is called a DC output voltage (VOS). This signal is referred to as an effective signal amplitude (Vout). Then, the effective signal amplitude is reset by the reset pulse RS, and a reset noise is superimposed on the output signal. The potential after the superimposition of the reset noise is a reference level of the output signal of the 4-line CCD sensor 10. Thus, a clamp pulse CP for stabilizing the potential of this signal component is input. The timing shown in FIG. 8 is a timing for general driving.

Another embodiment of the present invention will now be described.

Figure 9:
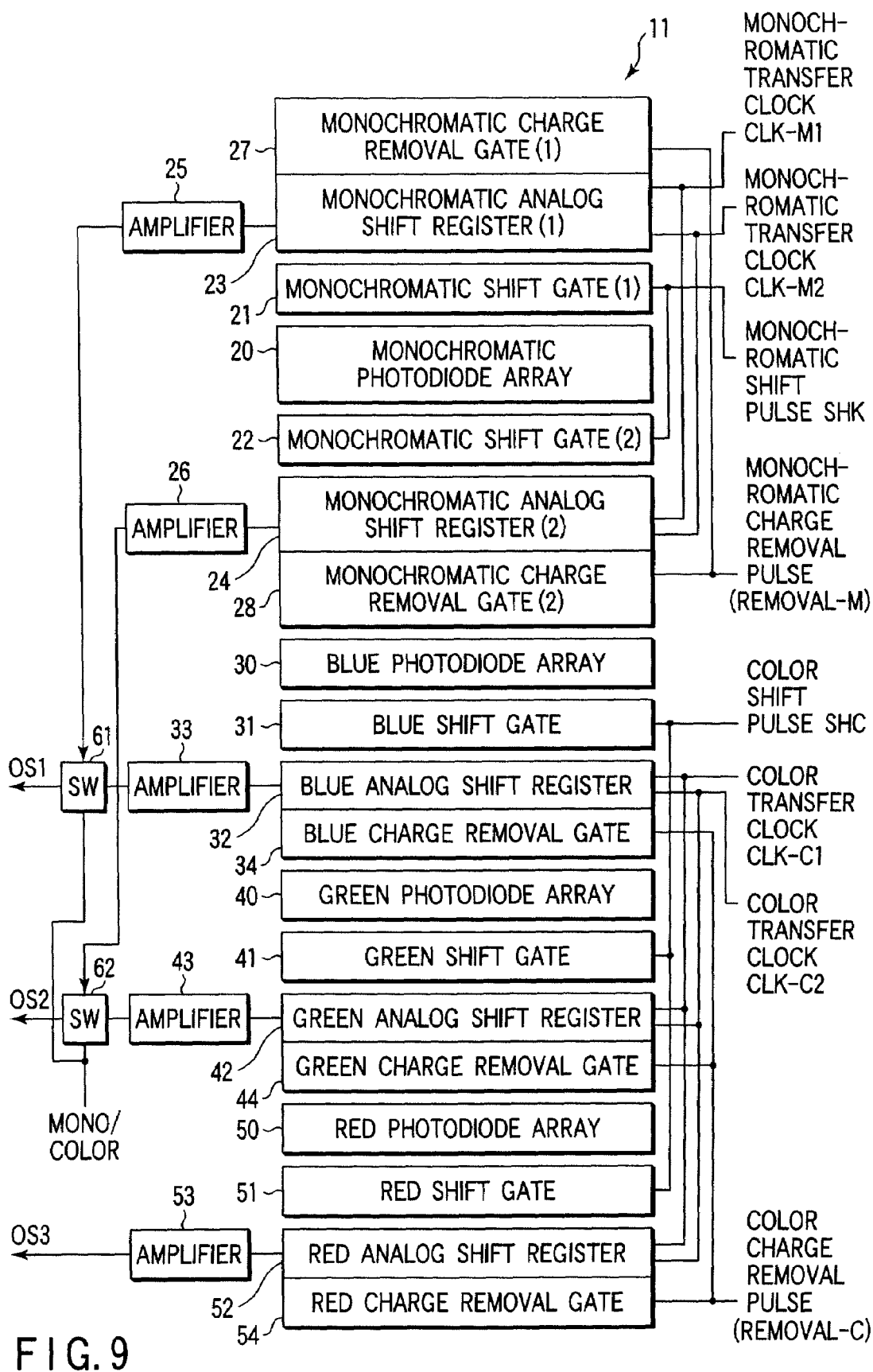
FIG. 9 is a block diagram schematically showing the structure of a CCD board having a 4-line CCD sensor.

FIG. 9 schematically shows the structure of a CCD board 11 having a 4-line CCD sensor 10 according to this embodiment. The components common to those in FIG. 3 are denoted by like reference numerals, and a description thereof is omitted.

Charges transferred to the monochromatic analog shift register 23 and monochromatic analog shift register 24 are successively shifted to the output direction by a monochromatic transfer clock CLK-M1 and a monochromatic transfer clock CLK-M2. The charge in the monochromatic analog shift register 23 is converted to a voltage signal and amplified by the amplifier 25. The amplified signal is delivered to the switch circuit (SW) 61. Similarly, the charge in the monochromatic analog shift register 24 is converted to a voltage signal and amplified by the amplifier 26. The amplified signal is delivered to the switch circuit (SW) 62.

In this embodiment, there are provided a monochromatic charge removal gate 27 provided adjacent to the monochromatic analog shift register 23, and a monochromatic charge removal gate 28 provided adjacent to the monochromatic analog shift register 24.

By controlling the monochromatic charge removal gate 27, the charge transferred to the monochromatic analog shift register 23 can be removed. That is, the charge transferred to the monochromatic analog shift register 23 is removed via the monochromatic charge removal gate 27 by a monochromatic charge removal pulse (REMOVAL-M).

At the same time, by controlling the monochromatic charge removal gate 28, the charge transferred to the monochromatic analog shift register 24 can be removed. That is, the charge transferred to the monochromatic analog shift register 24 is removed via the monochromatic charge removal gate 28 by the monochromatic charge removal pulse (REMOVAL-M).

The BLUE shift gate 31, GREEN shift gate 41 and RED shift gate 51 are controlled by a color shift pulse SHC.

The charge transferred to the BLUE analog shift register 32 is successively shifted to the output direction by a color transfer clock CLK-C1 and a color transfer clock CLK-C2. The charge in the BLUE analog shift register 32 is converted to a voltage signal and amplified by the amplifier 33. The amplified signal is delivered to the switch circuit (SW) 61.

The charge transferred to the GREEN analog shift register 42 is successively shifted to the output direction by the color transfer clock CLK-C1 and color transfer clock CLK-C2. The charge in the GREEN analog shift register 42 is converted to a voltage signal and amplified by the amplifier 43. The amplified signal is delivered to the switch circuit (SW) 62.

The charge transferred to the RED analog shift register 52 is successively shifted to the output direction by the color transfer clock CLK-C1 and color transfer clock CLK-C2. The charge in the RED analog shift register 52 is converted to a voltage signal and amplified by the amplifier 53. The amplified signal is output as an output signal OS3.

In this embodiment, there are provided a BLUE charge removal gate 34 provided adjacent to the BLUE analog shift register 32, a GREEN charge removal gate 44 provided adjacent to the GREEN analog shift register 42, and a RED charge removal gate 54 provided adjacent to the RED analog shift register 52.

By controlling the BLUE charge removal gate 34, the charge transferred to the BLUE analog shift register 32 can be removed. That is, the charge transferred to the BLUE analog shift register 32 is removed via the BLUE charge removal gate 34 by a color charge removal pulse (REMOVAL-C).

By controlling the GREEN charge removal gate 44, the charge transferred to the GREEN analog shift register 42 can be removed. That is, the charge transferred to the GREEN analog shift register 42 is removed via the GREEN charge removal gate 44 by the color charge removal pulse (REMOVAL-C).

Further, by controlling the RED charge removal gate 54, the charge transferred to the RED analog shift register 52 can be removed. That is, the charge transferred to the RED analog shift register 52 is removed via the RED charge removal gate 54 by the color charge removal pulse (REMOVAL-C).

In this embodiment, the monochromatic transfer clock CLK-M1 and monochromatic transfer clock CLK-M2 are used to control the driving of the monochromatic analog shift register 23 and monochromatic analog shift register 24. In addition, the color transfer clock CLK-C1 and color transfer clock CLK-C2 are used to control the driving of the BLUE analog shift register 32, GREEN analog shift register 42 and RED analog shift register 52. Thereby, the monochromatic control and color control can independently be performed.

In the above-described structure, the drive timing on the CCD board 11 having the 4-line CCD sensor 10 shown in FIG. 9 will now be described with reference to FIGS. 10 and 11. The drive timing is controlled by the CPU 100 on the CCD control board 12 that is the control section.

FIG. 10 shows the drive timing at the time of monochromatic reading. When a monochromatic original O is read, the output from only the monochromatic photodiode array 20 is rendered effective. At this time, outputs from the BLUE photodiode array 30, GREEN photodiode array 40 and RED photodiode array 50 are needless. In addition, if the BLUE analog shift register 32, GREEN analog shift register 42 and RED analog shift register 52 are operated, induced noise is superimposed on the monochromatic output signals.

Thus, in this embodiment, the monochromatic shift pulse SHK, monochromatic transfer clock CLK-M1 and monochromatic transfer clock CLK-M2 are applied at the timing illustrated in FIG. 10. In this case, the color shift pulse SHC is fixed at "H" level, color transfer clock CLK-C1 is fixed at "L" level and color transfer clock CLK-C2 is fixed at "H" level. Thereby, the color-associated functions are halted.

With this drive timing, the monochromatic reading free from induction due to other channels can be achieved.

In this case, too, light is radiated on all the photodiode arrays (20, 30, 40, 50). As a result, charge gradually moves to the BLUE analog shift register 32, GREEN analog shift register 42 and RED analog shift register 52.

Accordingly, the color charge removal pulse (REMOVAL-C) is fixed at "H" level, whereby the BLUE charge removal gate 34, GREEN charge removal gate 44 and RED charge removal gate 54 release the charge accumulated in each analog shift register (30, 40, 50) to a reference potential level. Thus, the charge accumulated in each analog shift register (30, 40, 50) can be removed, and saturation of charge in the analog shift register can be prevented.

At this time, the monochromatic charge removal pulse (REMOVAL-M) is set at "L" level, thereby to prevent leak of charge from the monochromatic analog shift registers 23 and 24.

FIG. 11 shows the drive timing at the time of color reading. When a color original O is read, the outputs from the BLUE photodiode array 30, GREEN photodiode array 40 and RED photodiode array 50 are rendered effective. At this time, the output from the monochromatic photodiode array 20 is needless. In addition, if the monochromatic analog shift registers 23 and 24 are operated, induced noise is superimposed on the respective color output signals.

Thus, in this embodiment, the color shift pulse SHC, color transfer clock CLK-C1 and color transfer clock CLK-C2 are applied at the timing illustrated in FIG. 11. In this case, the monochromatic shift pulse SHK is fixed at "H" level, monochromatic transfer clock CLK-M1 is fixed at "L" level and monochromatic transfer clock CLK-M2 is fixed at "H" level. Thereby, the respective monochromatic functions are halted.

With this drive timing, the color reading free from induction due to the monochromatic system can be achieved.

The monochromatic charge removal pulse (REMOVAL-M) is fixed at "H" level, whereby the monochromatic charge removal gates 27 and 28 release the charge accumulated in the monochromatic analog shift registers 23 and 24 to a reference potential level. Thus, the charge accumulated in the monochromatic analog shift registers 23 and 24 can be removed, and saturation of charge in the analog shift register can be prevented.

At this time, the color charge removal pulse (REMOVAL-C) is set at "L" level, thereby to prevent leak of charge from each color analog shift register (32, 42, 52).

Figure 12:
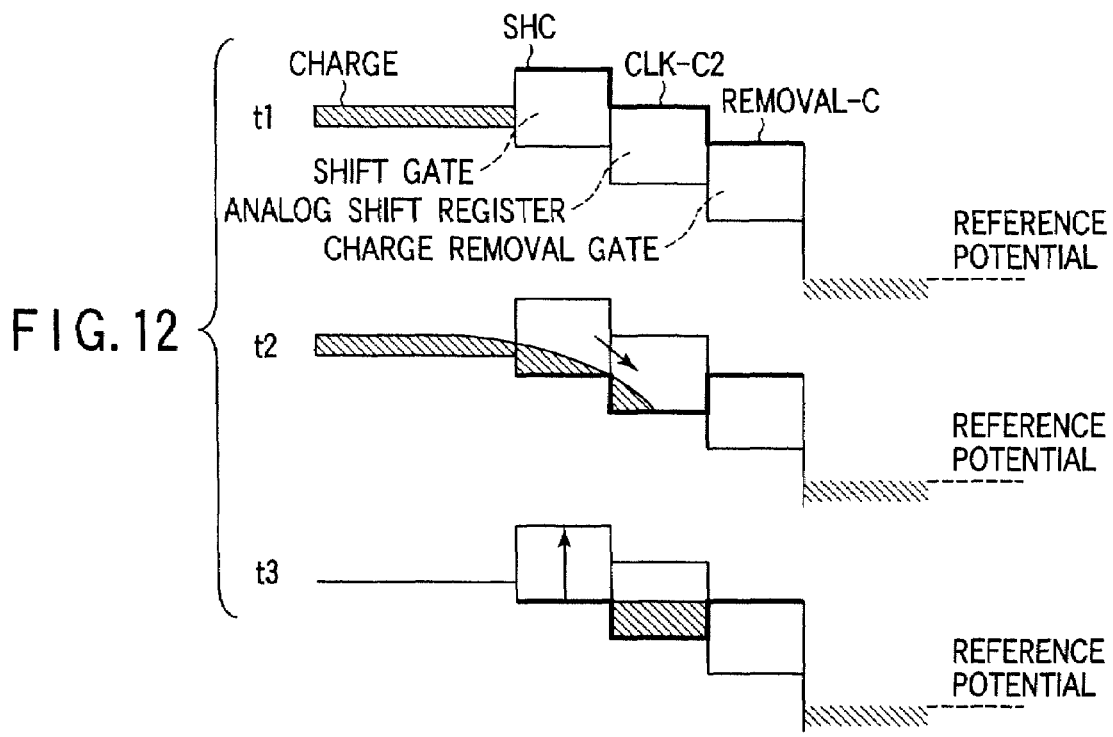
FIG. 12 schematically illustrates charge transfer at the time of color image reading.

FIG. 12 schematically illustrates transfer of charge at the time of color image reading. In the timing shown in FIG. 11, when time t=t1 in FIG. 13, all the gates are raised, as shown in FIG. 12, and no charge moves. That is, the color shift pulse SHC is at "L" level, color transfer clock CLK-C2 is at "L" level, and color charge removal pulse (REMOVAL-C) is at "L" level, and thus all the gates are raised.

Figures 13, 15:
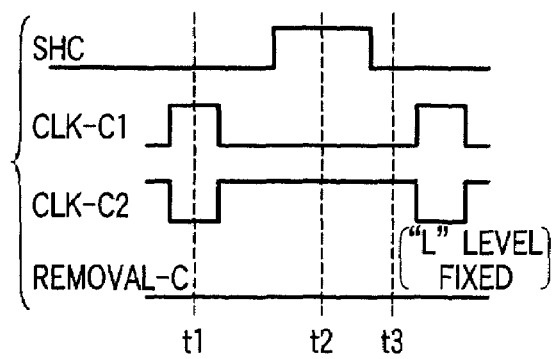
FIG. 13 is a view for explaining a drive timing of each signal.
FIG. 15 is a view for explaining a drive timing of each signal.

Then, when time t=t2 in FIG. 13, charge is transferred to each color analog shift register (32, 42, 52) via each color shift gate (31, 41, 51), as shown in FIG. 12. That is, the color shift pulse SHC is at "H" level and color transfer clock CLK-C2 is at "H" level, and thus charge moves to each color analog shift register (32, 42, 52) via each color shift gate (31, 41, 51). At this time, since the color charge removal pulse (REMOVAL-C) is fixed at "L" level, charge does not move to a reference potential level.

Subsequently, when time t=t3 in FIG. 13, charge accumulation begins in each color analog shift register (32, 42, 52). That is, the color shift pulse SHC is at "L" level and color transfer clock CLK-C2 is at "H" level. Thus, each color shift gate (31, 41, 51) is closed, and charge accumulation begins in each color analog shift register (32, 42, 52).

Figure 14:
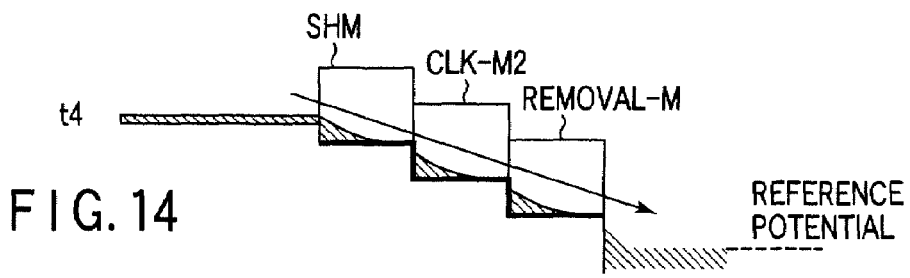
FIG. 14 schematically illustrates charge transfer of a monochromatic system.

In the monochromatic system, when time t=t4 in FIGS. 14 and 15, the charge photoelectrically converted by the monochromatic photodiode array 20 is shifted to a reference potential level via the monochromatic gates 21 and 22 and monochromatic charge removal gates 27 and 28. That is, the monochromatic shift pulse SHK is fixed at "H" level, monochromatic transfer clock CLK-M2 is fixed at "H" level, and monochromatic charge removal pulse (REMOVAL-M) is fixed at "H" level. Thus, as shown in FIG. 14, the monochromatic shift gates 21 and 22, monochromatic analog shift registers 23 and 24 and monochromatic charge removal gates 27 and 28 are all lowered. As a result, the charge photoelectrically converted by the photodiode array 20 is shifted to a reference potential level via each gate (21, 22, 27, 28).

Although not illustrated, the same applies to the monochromatic reading. The charge for each color moves to a reference potential level, and only the charge for monochrome is rendered effective and output to the outside.

When the image input apparatus 1 is not operated, for example, in the standby state, the internal operation of the 4-line CCD sensor 10 can be stopped by fixing all of the following signals at "H" level: the color shift pulse SHC, monochromatic shift pulse SHK, color transfer clock CLK-C2, monochromatic transfer clock CLK-M2, color charge removal pulse (REMOVAL-C), and monochromatic charge removal pulse (REMOVAL-M).

Thereby, the power consumption can be reduced, heat generation of the 4-line CCD sensor 10 is prevented, and radiant noise from the 4-line CCD sensor 10 can be eliminated.

In the above description, the control of the CLK-C1 and CLK-M1 is not mentioned. These signals may be fixed at "L" level, in addition to the above driving conditions. Thereby, it is possible to obtain the following advantage: the power consumption can be reduced, heat generation of the 4-line CCD sensor 10 is prevented, and radiant noise from the 4-line CCD sensor 10 can be eliminated.

As has been described above, according to the embodiments of the present invention, a high-quality image with a small noise component can be obtained at the time of monochromatic reading or color reading.

The 4-line CCD sensor disposed in a single device can be driven independently in a monochromatic reading operation and in a color reading operation of the CCD sensor.

In addition, a high-quality image with a small noise component can be obtained at the time of monochromatic reading or color reading.

Furthermore, it is possible to execute a drive control with reduced power consumption in a standby mode, without production of radiant noise.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image input apparatus having a light source that illuminates an original, comprising:

a CCD device including a first, second, third and fourth photodiode arrays that receive reflective light from the original illuminated by the light source, a first shift gate configured to transfer a charge converted photoelectrically by the first photodiode array to a first analog shift register upon receiving a first level signal and configured not to transfer the charge converted photoelectrically by the first photodiode array to the first analog shift register upon receiving a second level signal, a second shift gate configured to transfer a charge converted photoelectrically by the second photodiode array to a second analog shift register upon receiving a third level signal and configured not to transfer the charge converted photoelectrically by the second photodiode array to the second analog shift register upon receiving a fourth level signal, a third shift gate configured to transfer a charge converted photoelectrically by the third photodiode array to a third analog shift register upon receiving the third level signal and configured not to transfer the charge converted photoelectrically by the third photodiode array to the third analog shift register upon receiving the fourth level signal, and a fourth shift gate configured to transfer a charge converted photoelectrically by the fourth photodiode array to a fourth analog shift register upon receiving the third level signal and configured not to transfer the charge converted photoelectrically by the fourth photodiode array to the fourth analog shift register upon receiving the fourth level signal; and a control section that effects a control to apply the first level signal to the first shift gate for a first period of time and to apply the second level signal to the first shift gate for a second period of time after the first period of time and a control to apply the third level signal to the second, third and fourth shift gates for the first and second period of time in reading of a monochromatic original, and a control to apply the third level signal to the second, third and fourth shift gates for a third period of time and to apply the fourth level signal to second, third and fourth shift gates for a fourth period of time after the third period of time and a control to apply the first level signal to the first shift gate for the third and fourth period of time.

* * * * *